(12) United States Patent
Sasaki

(10) Patent No.: US 6,477,004 B2
(45) Date of Patent: Nov. 5, 2002

(54) THIN FILM MAGNETIC HEAD

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/740,058

(22) Filed: Dec. 20, 2000

(65) Prior Publication Data

US 2001/0000984 A1 May 10, 2001

Related U.S. Application Data

(62) Division of application No. 09/087,974, filed on Jun. 1, 1998, now Pat. No. 6,195,872.

(30) Foreign Application Priority Data

Mar. 12, 1998 (JP) .............................................. 10-61476

(51) Int. Cl.$^7$ ............................................... G11B 5/17
(52) U.S. Cl. ..................................................... 360/123
(58) Field of Search ................................. 360/123, 125, 360/126, 317

(56) References Cited

U.S. PATENT DOCUMENTS

| | | | |
|---|---|---|---|
| 4,933,209 A | 6/1990 | Anthony et al. | 427/116 |
| 4,966,648 A | 10/1990 | Nakamura et al. | 156/643 |
| 5,113,300 A * | 5/1992 | Ikeda et al. | |
| 5,184,394 A | 2/1993 | Hsie et al. | 29/603 |
| 5,404,635 A | 4/1995 | Das | 29/603 |
| 5,406,695 A | 4/1995 | Amemori | 29/603 |
| 5,445,707 A | 8/1995 | Toyama et al. | 216/22 |
| 5,566,442 A | 10/1996 | Gaud et al. | 29/603.14 |
| 5,815,909 A | 10/1998 | Gray | 29/603.14 |
| 5,916,423 A | 6/1999 | Westwood | 204/192.32 |
| 5,966,800 A | 10/1999 | Huai et al. | 29/603.13 |

FOREIGN PATENT DOCUMENTS

| | | |
|---|---|---|
| JP | A-62-42311 | 2/1987 |
| JP | A-63-113812 | 5/1988 |
| JP | A-6-180821 | 6/1994 |
| JP | A-6-267776 | 9/1994 |

* cited by examiner

Primary Examiner—George J. Letscher
(74) Attorney, Agent, or Firm—Oliff & Berridge, PLC

(57) ABSTRACT

In a thin film magnetic head including a first magnetic layer 36, a write gap layer 41 and a second magnetic layer 42, 47 formed on a substrate 31, 32 and one or more thin film coil layers provided between the first and second magnetic layers, in order to shorten a magnetic path length of the thin film coil and to improve characteristics by reducing a spacing between successive coil windings of at least one thin film coil layer, a silicon oxide film 37 is formed on the first magnetic layer 36, coil-shaped recesses 38 are formed by a reactive ion etching in a surface of the silicon oxide layer with a narrow spacing, a copper layer is deposited by Cu-CVD, the copper layer is polished by CMP such that the surface of the silicon oxide layer is exposed to form coil windings 40 of the first thin film coil layer, and the write gap layer is formed on the coil windings. Since an inorganic insulating layer made of silicon oxide, silicon nitride or alumina which can be subjected to a fine processing by a reactive ion etching is used, the coil windings 40 can be formed with an extremely small spacing such as 0.3–0.5 $\mu$m.

12 Claims, 12 Drawing Sheets

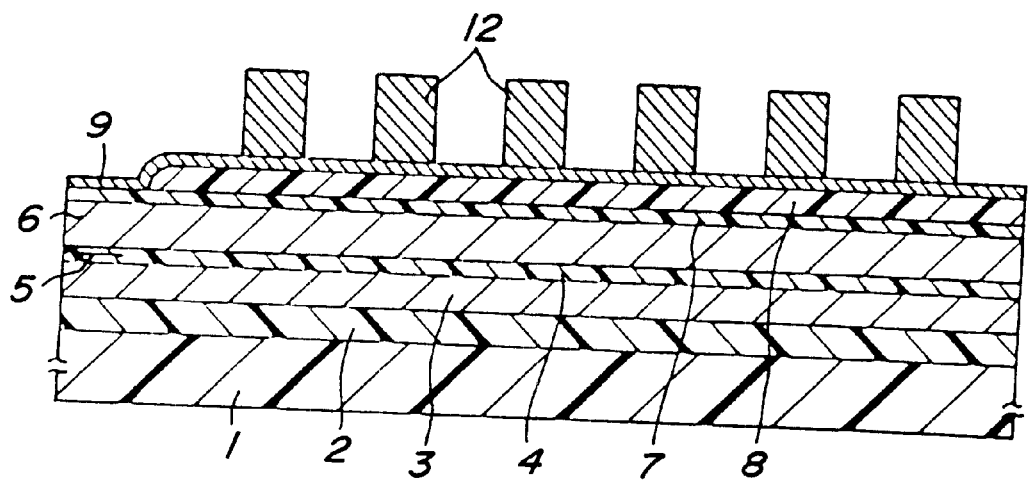
FIG_4 PRIOR ART
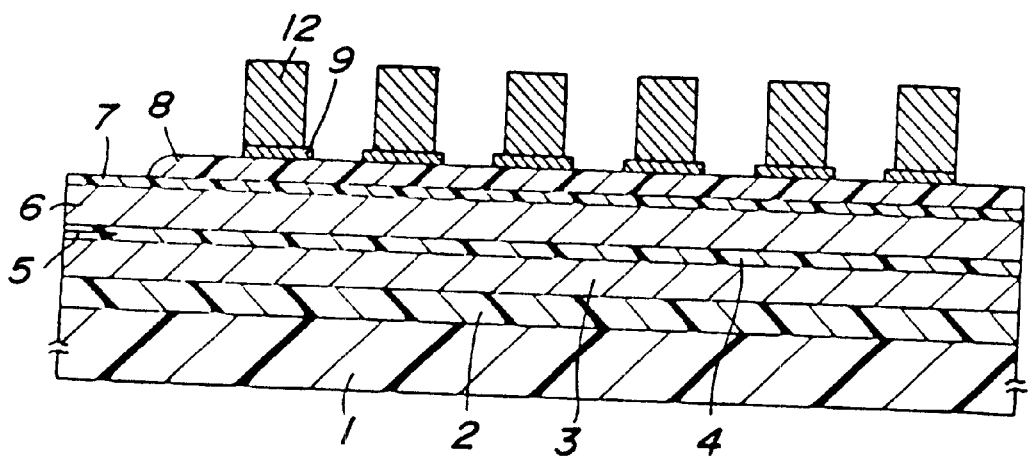
FIG_5 PRIOR ART

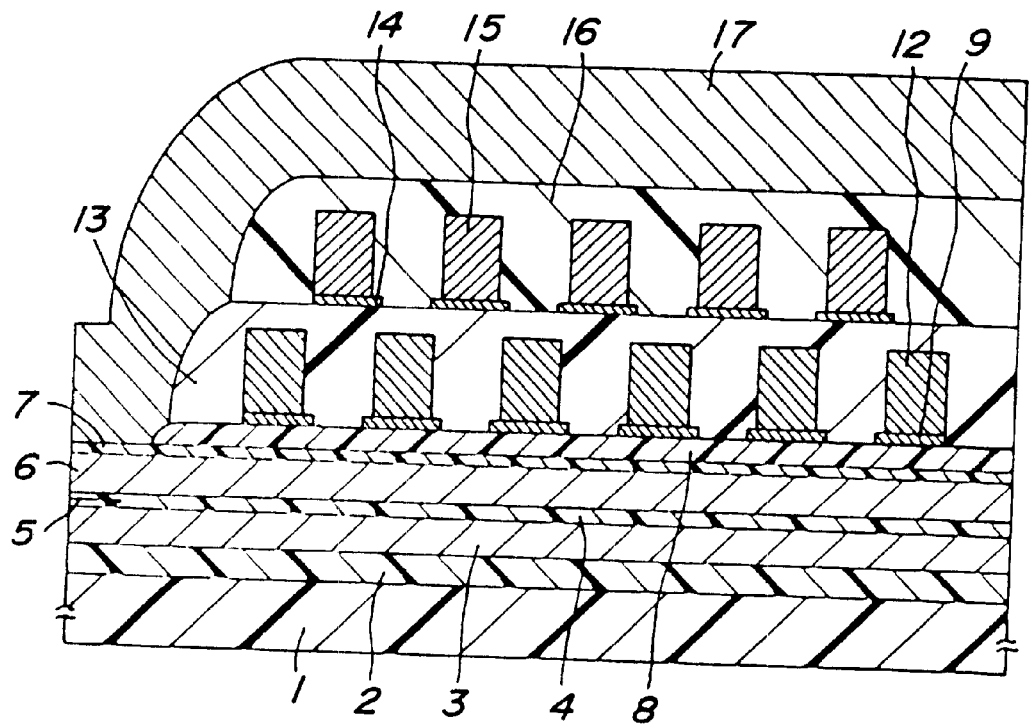
FIG_6
PRIOR ART

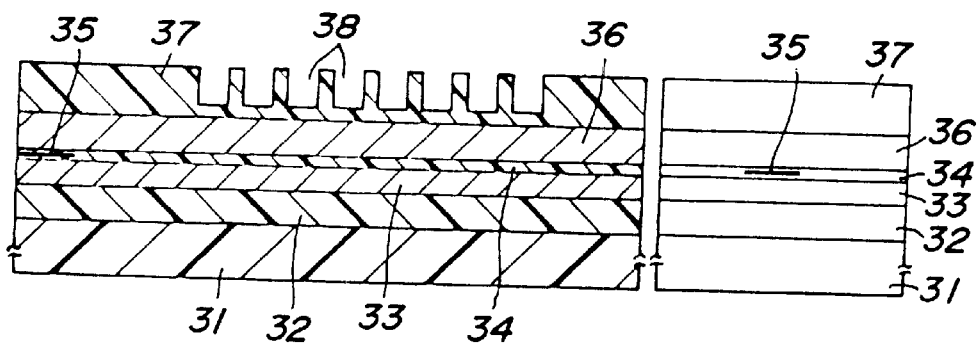
FIG_13A    FIG_13B
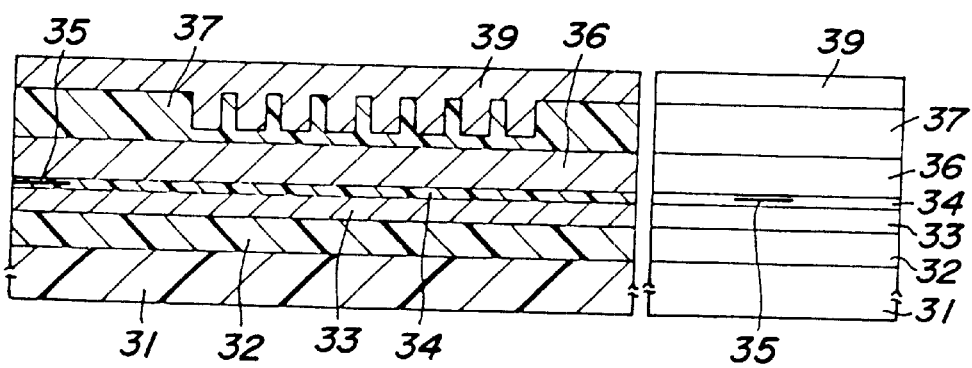
FIG_14A    FIG_14B
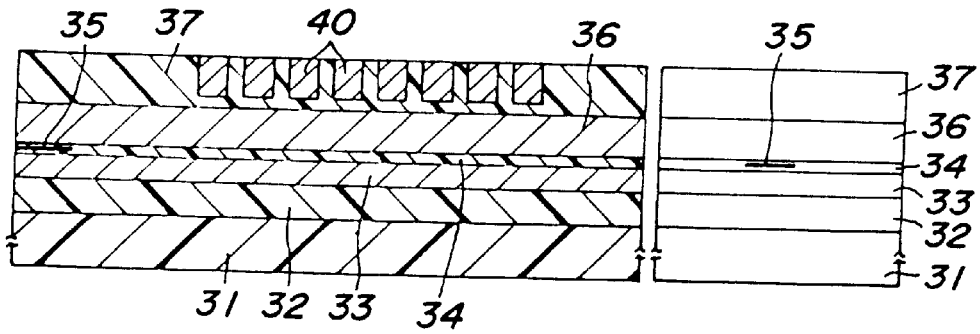
FIG_15A    FIG_15B

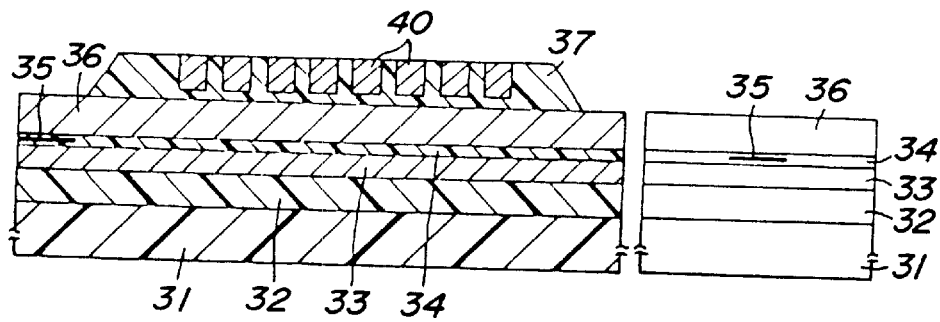
FIG_16A  FIG_16B
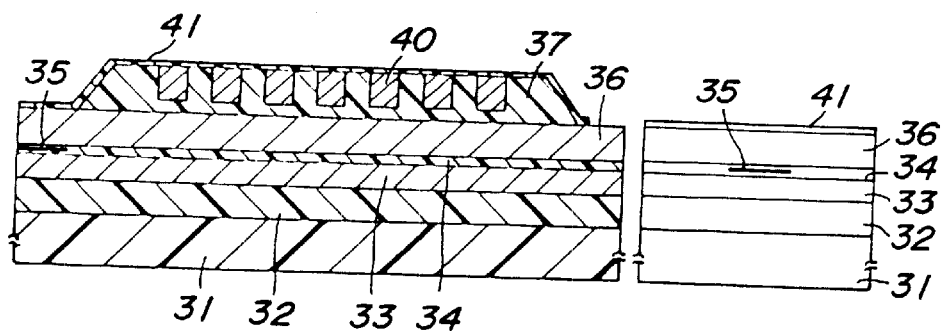
FIG_17A  FIG_17B
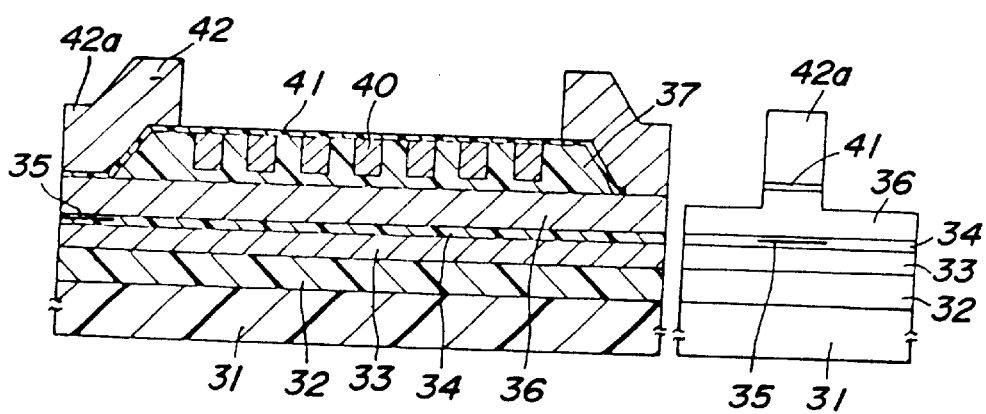
FIG_18A  FIG_18B

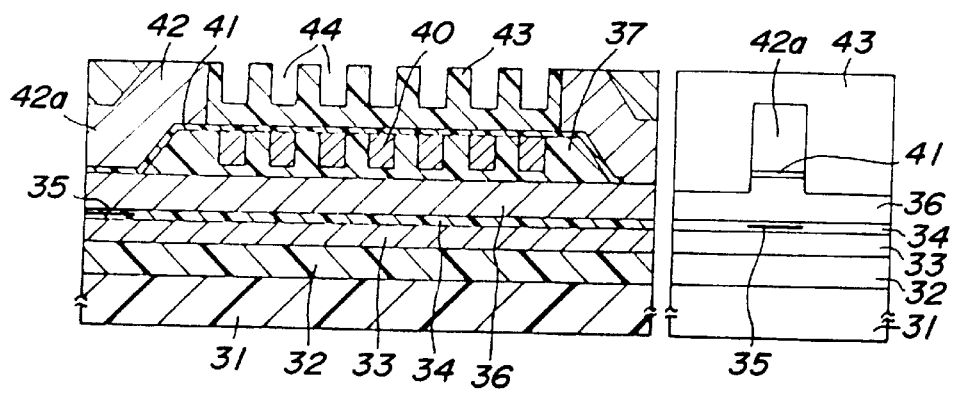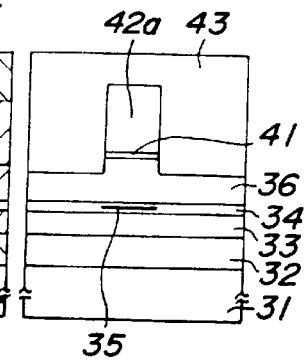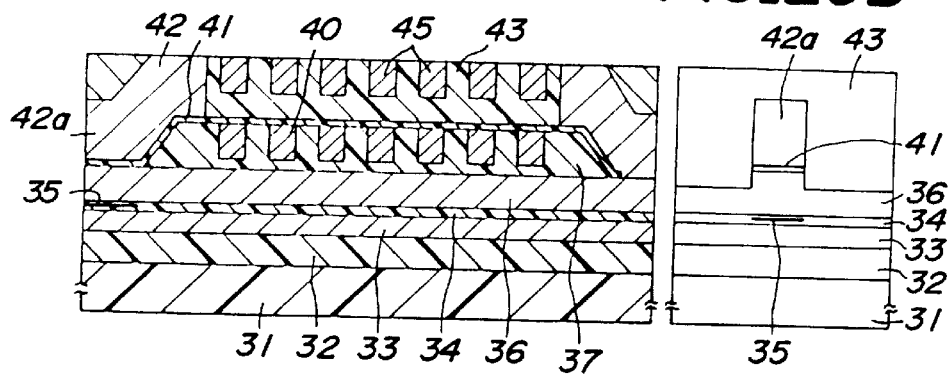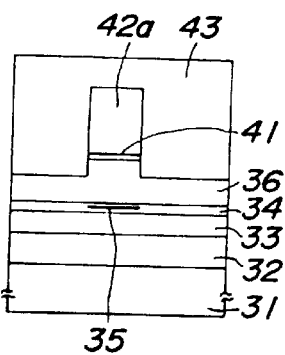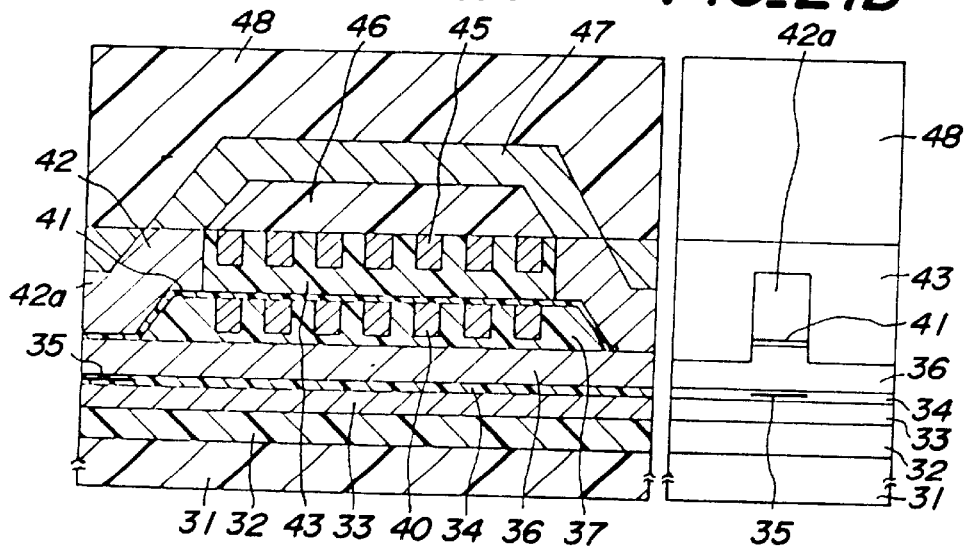

FIG_22
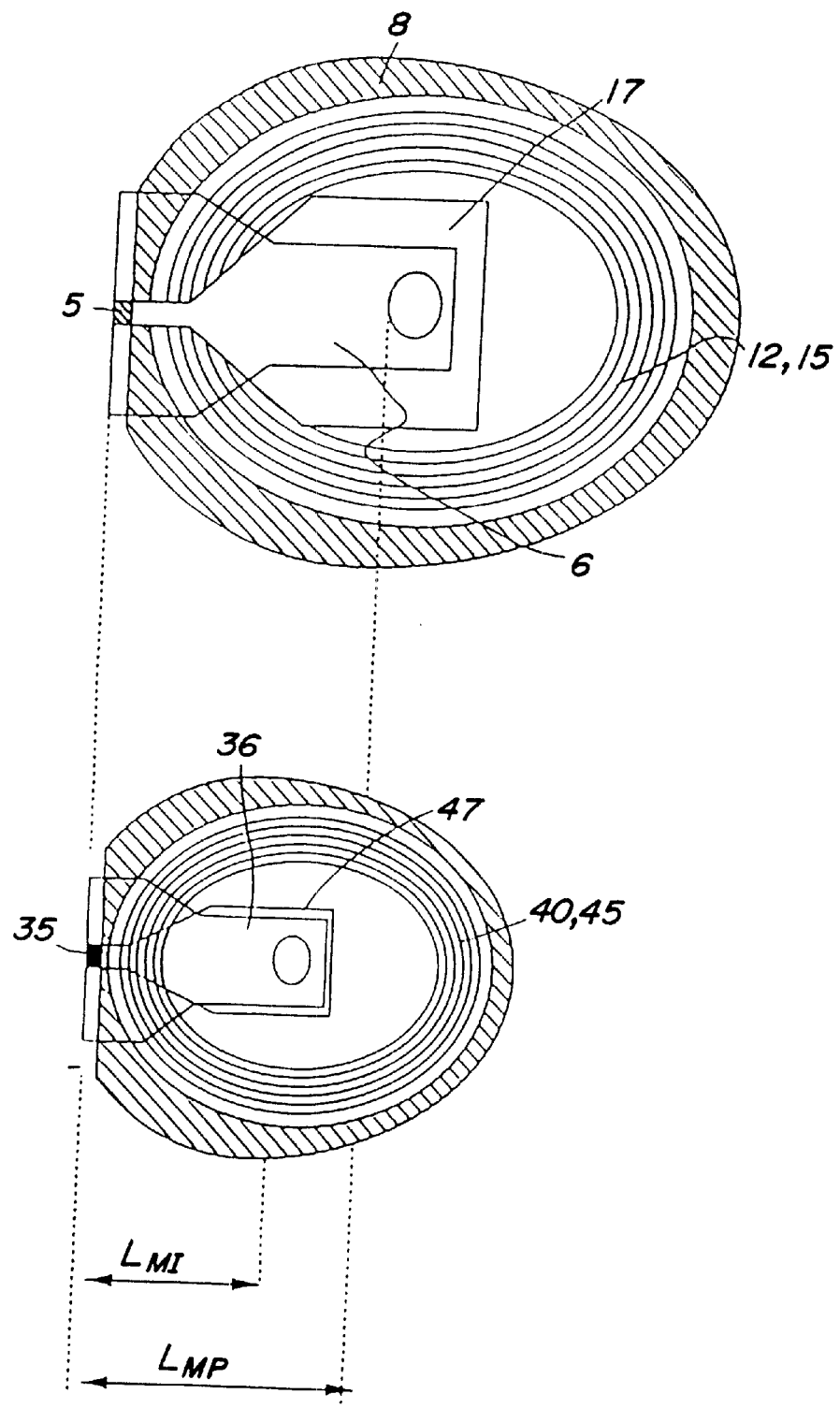

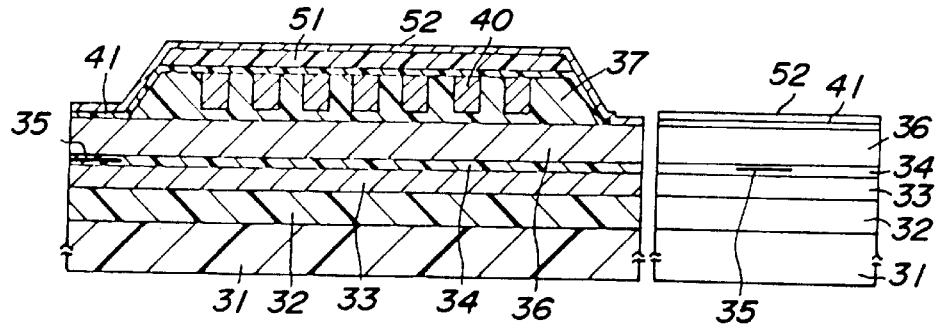
FIG._23A  FIG._23B
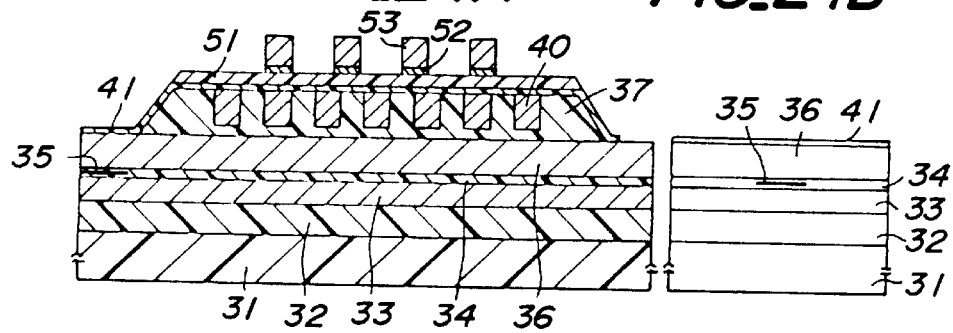
FIG._24A  FIG._24B
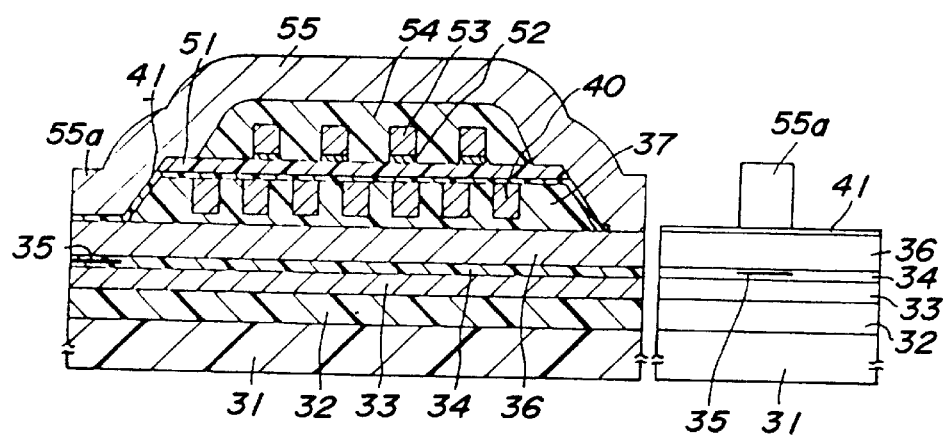
FIG._25A  FIG._25B

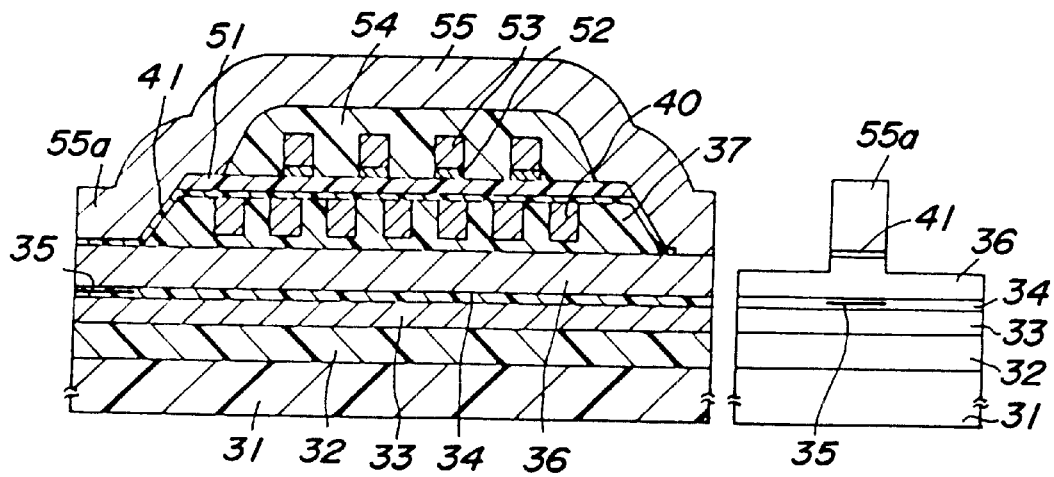
FIG_26A  FIG_26B
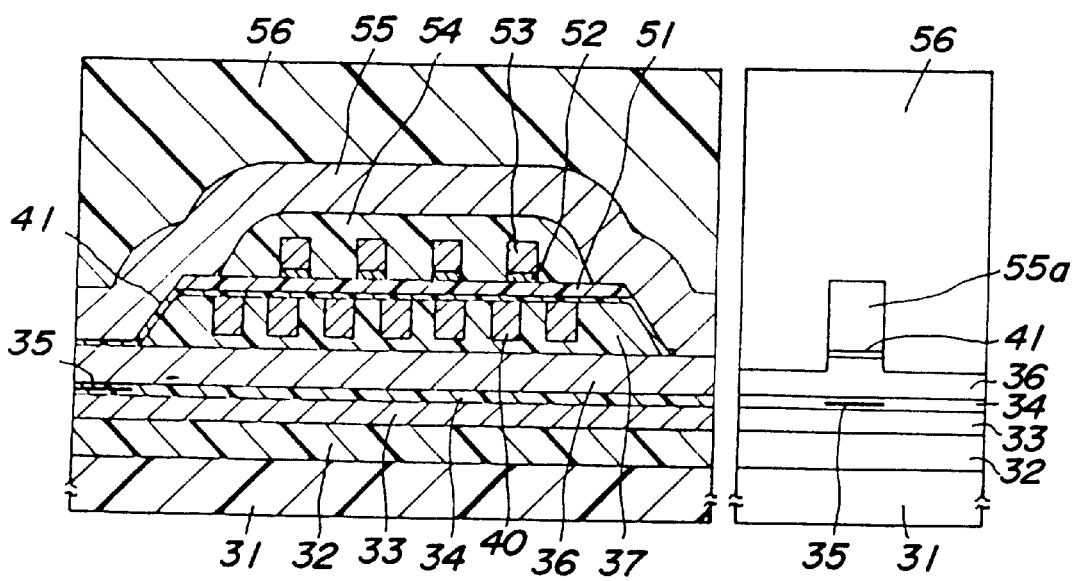
FIG_27A  FIG_27B

FIG_28
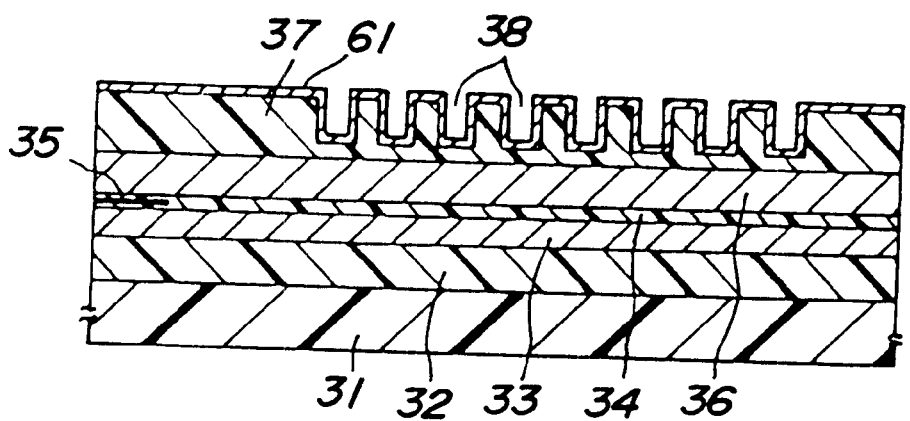
FIG_29
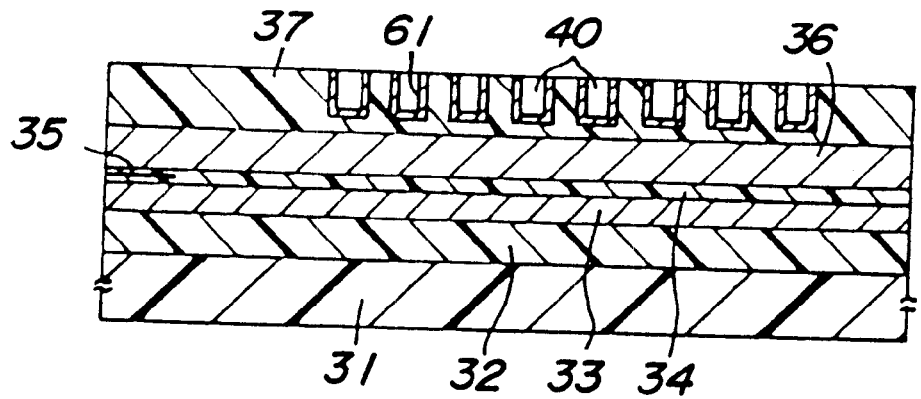

THIN FILM MAGNETIC HEAD

This is a Division of application Ser. No. 09/087,974 filed Jun. 1, 1998 now U.S. Pat. No. 6,195,872. The entire disclosure of prior application(s) is hereby incorporated by reference herein in its entirety.

BACKGROUND OF THE INVENTION

1. Field of the Invention

The present invention relates to a thin film magnetic head and a method of manufacturing the same, and more particularly to an inductive type writing magnetic head and a method of manufacturing the same.

2. Description of the Related Art

Recently a surface recording density of a hard disc device has been improved, and it has been required to develop a thin film magnetic head having an improved performance accordingly. In order to satisfy such a requirement, there has been proposed a magnetic head, in which a reading or reproducing magnetic head and a writing or recording magnetic head are stacked one on the other. In such a magnetic head, an inductive type thin film magnetic head is used as the writing head and a magneto-resistive type thin film magnetic head is used as the reading head. As the magnetoresistive type magnetic head, a magnetoresistive element having a conventional anisotropic magnetoresistive (AMR) effect has been widely utilized. There has been further developed a magnetoresistive element utilizing a giant magnetoresistive (GMR) effect having a resistance change ratio higher than the normal anisotropic magnetoresistive effect by several times. In the present specification, these AMR and GMR elements are termed as a magnetoresistive reproducing element or MR reproducing element.

By using the AMR element, a very high surface recording density of several gigabits per a unit square inch can be realized, and a surface recording density can be further increased by using the GMR element. By increasing a surface recording density in this manner, it is possible to realize a hard disc device which has a very large storage capacity of more than 10 gigabytes and is small in size.

A height of a magnetoresistive reproducing element (MR Height: MRH) is one of factors which determine a performance of a reproducing head including a magnetoresistive reproducing element. This MR height MRH is a distance measured from an air bearing surface on which the magnetoresistive reproducing element exposes to an edge of the element remote from the air bearing surface. During a manufacturing process of the magnetic head, a desired MR height MRH can be obtained by controlling an amount of polishing the air bearing surface.

As stated above, a performance of the reproducing head may be improved by utilizing the GMR element. Then, a performance of a recording head is required to be improved accordingly. In order to increase a surface recording density, it is necessary to make a track density on a magnetic record medium as high as possible. For this purpose, a width of a pole portion and write gap at the air bearing surface has to be reduced to a value within a range from several microns to several submicrons. In order to satisfy such a requirement, the semiconductor manufacturing process has been utilized in manufacturing the thin film magnetic head.

One of factors determining a performance of the inductive type thin film writing magnetic film is a throat height (TH). This throat height TH is a distance of a pole portion measured from the air bearing surface to an edge of an insulating layer which serves to separate a thin film coil from the air bearing surface. It has been required to shorten this distance as small as possible. This distance can be also determined by controlling an amount of polishing the air bearing surface.

In order to improve a performance of the inductive type thin film writing magnetic head, it has been proposed to shorten a length of portions of bottom pole and top pole surrounding the thin film coil (in this specification, said length is called a magnetic path length).

FIGS. 1–8 are cross sectional views showing successive steps of a known method of manufacturing a conventional typical composite magnetic head including a GMR element, said cross sectional views being cut along a plane perpendicular to the air bearing surface. In this example, a composite type thin film magnetic head is constructed by stacking an inductive type writing thin film magnetic head on a magnetoresistive type reading thin film magnetic head.

At first, as illustrated in FIG. 1, on a substrate 1 made of a non-magnetic material such as AlTiC, is deposited an insulating layer 2 made of alumina ($Al_2O_3$) and having a thickness of about 5–10 $\mu$m, a bottom shield layer 3 constituting a magnetic shield for the MR reproducing magnetic head and having a thickness of about 3–4 $\mu$m is deposited on the insulating layer, and then a GMR layer 5 having a thickness of several tens nanometers (nm) is formed such that the GMR layer is embedded in a shield gap layer 4. On the shield gap layer 4, is further deposited a magnetic layer 6 made of a permalloy and having a thickness of 3–4 $\mu$m. This magnetic layer 6 serves not only as an upper shield layer for magnetically shielding the GMR reproducing element together with the above mentioned bottom shield layer 3, but also as a bottom magnetic layer of the inductive type writing thin film magnetic head. Here, for the sake of explanation, the magnetic layer 6 is called a first magnetic layer, because this magnetic layer constitutes one of magnetic layers forming the writing thin film magnetic head.

Next, as shown in FIG. 2, on the first magnetic layer 6, is formed a write gap layer 7 made of a nonmagnetic material such as alumina to have a thickness of about 200 nm. A photo-resist layer 8 for determining a throat height TH is formed on the write gap layer 7 except for a portion which will constitute a pole portion, and then a thin copper layer 9 having a thickness of about 100 nm is deposited on a whole surface by sputtering. The copper layer 9 will serve as a seed layer for a process of forming a thin film coil by an electroplating, and thus this layer is also called a seed layer. On this seed layer 9, is formed a thick photo-resist layer 10 having a thickness of 3 $\mu$m, and openings 11 are formed in the photo-resist layer such that the seed layer 9 is exposed in the openings. A height of the openings is 2 $\mu$m which is identical with a thickness of the photo-resist layer and a width of the openings is also 2 $\mu$m.

Next, an electroplating of copper is performed using an electro-plating liquid of a copper sulfate to form coil windings 12 of a first thin film coil layer within the openings 11 formed in the photo-resist layer 10, said coil windings having a thickness of 2–3 $\mu$m. A thickness of the coil windings 12 is preferably smaller than a depth of the openings 11.

Then, as depicted in FIG. 4, after removing the photo-resist layer 10, a milling process is conducted with an argon ion beam to remove the seed layer 9 as shown in FIG. 5 such that the coil windings 12 are separated from each other to form a single body of a coil. During the ion beam milling, in order to avoid that a part of the seed layer 9 situating underneath the bottoms of the coil windings 12 is remained to extend from the thin film coil, the ion beam milling is performed with an incident angle of 5–10°. When the ion beam milling is carried out with substantially upright angles, a material of the seed layer 9 which is spread by an impact of the ion beam is liable to be adhered to surroundings. Therefore, a distance between successive coil windings 12 has to be large.

Next, as illustrated in FIG. 6, a photo-resist layer 13 is formed such that the coil windings 12 of the first thin film coil layer are covered with the photo-resist layer, and after polishing a surface to be flat, coil windings 15 of a second thin film coil layer is formed on a seed layer 14 by the same process as that described above. After forming a photoresist layer 16, a second magnetic layer 17 made of a permalloy is formed to have a thickness of 3–7 μm, said second magnetic layer constituting a top pole.

Next, as shown in FIGS. 7 and 8, the write gap layer 7 and a surface of the first magnetic layer 6 are etched to form a trim structure, while a pole portion of the second magnetic layer 17 is utilized as an etching mask. Then, an overcoat layer 18 made of alumina is formed on a whole surface. It should be noted that FIG. 8 is a cross sectional view cut along a line 8—8 in FIG. 7. In FIG. 8, there are shown first and second shield gap layers 4a and 4b constituting the shield gap layer 4 and conduction layers 5a and 5b for providing an electrical connection to the GMR element.

In an actual manufacturing process of the thin film magnetic head, after forming a number of the above mentioned structures on a single wafer, the wafer is divided into bars each including a plurality of thin film magnetic heads aligned along the bar, and a side wall of the bar is polished to obtain the air bearing surfaces 19 (refer to FIG. 7) of the magnetic heads. During the formation of the air bearing surface 19, the GMR layer 5 is also polished to obtain a composite type thin film magnetic head having desired throat height and MR height. Furthermore, in an actual process, contact pads for establishing electrical connections to the thin film coils 12, 15 and GMR reproducing element are formed. But these contact pads are not shown in the drawings.

Moreover, an apex angle θ between a straight line S connecting side edges of the photo-resist layers 8, 13 and 16 on a side of the air bearing surface 19 and a surface plane of the substrate as shown in FIG. 7 is an important factor for determining a property of the thin film magnetic head together with the throat height and MR height.

Further, since a track width on a magnetic record medium is determined by a width W of the trim structure formed by a pole portion 6a of the first magnetic layer 6 and a pole portion 17a of the second magnetic layer 17, it is necessary to make said width W as small as possible in order to realize a high surface recording density.

In the known composite type thin film magnetic head manufactured by the above explained process, there is a problem in miniaturizing the inductive thin film writing magnetic head. That is to say, it has been known to improve characteristics such as flux rise time, non-linear transition shift (NLTS) and over write by reducing the magnetic path length LM which is a length of portions of the first magnetic layer 6 and second magnetic layer 17 which surround the coil windings 12 and 15 of the thin film coil as illustrated in FIG. 7. In order to reduce the magnetic path length $L_M$, it is necessary to shorten a coil width $L_C$ of a portion of the thin film coil 12, 15 which surrounds the first and second magnetic layers 6 and 17. However, in the known thin film magnetic head, the coil width $L_C$ could not be shortened due to the following reasons.

In order to shorten the coil width $L_C$ in the known thin film magnetic head, it is necessary to decrease a width of respective coil windings as well as to reduce a width of a spacing between successive coil windings. However, a reduction in a width of the coil winding is limited due to a fact that a resistance of the coil winding should be low. That is to say, although a coil winding is made of a copper having a low resistance, a height of a coil winding is limited to 2–3 μm, and thus a width of the coil winding could not be smaller than 1.5 μm. Therefore, in order to shorten the coil width $L_C$, it is necessary to reduce a spacing between successive coil windings.

However, in the known thin film magnetic head, a coil spacing between adjacent coil windings 12, 15 could not be shortened due to the following reasons.

As stated above, the coil windings 12, 15 are formed by the electroplating method, in which the seed layer 9 having a thickness of 100 nm is formed for uniformly depositing a copper over a whole surface of a wafer, the coil windings 12, 15 are formed by selectively depositing a copper within the openings 11 in which the seed layer is exposed, and the seed layer 9 is selectively removed for separating respective coil windings. Upon removing the seed layer 9, an ion milling, for instance an argon ion milling is carried out while the coil windings 12, 15 are used as a mask.

Here, in order to remove the seed layer 9 between successive coil windings 12, 15, it would be preferable to conduct the ion milling from a direction perpendicular to the substrate surface. However, when the ion milling is effected from such a direction, copper debris might adhere to side walls of the coil windings and successive coil windings might not be isolated sufficiently. In order to avoid such a problem, in the known thin film magnetic head, a spacing between successive coil windings could not be shortened.

Furthermore, in order to solve the above problem, an ion milling may be performed with an incident angle of 40–45°. Then, an ion beam could not be sufficiently made incident upon shadow portions of the photoresist 10 and the seed layer 9 might be remained. In this manner, in order to avoid the degradation of the insulation between successive coil windings 12, 15, a spacing between adjacent coil windings could not be shortened. Therefore, in the known thin film magnetic head, a spacing between successive coil windings has to be wider such as 2–3 μm and could not be made smaller than 2–3 μm.

Moreover, upon forming the thin film coil windings 12, 15 by the above mentioned electroplating method, in order to guarantee a uniformity in a thickness of the coil windings, it is necessary to stir a plating solution such as a copper sulfate. If a thickness of walls defining the openings 11 in the photoresist layer 10 is made smaller for reducing a spacing between successive coil windings, the thin walls might be destroyed and the thin film coil could not be formed accurately. Therefore, a spacing between adjacent coil windings of the thin film coil could not be shortened also due to this reason.

In the known thin film magnetic head, a reference position for a throat height TH, that is a throat height zero position is given by the photoresist layer 8. After forming the first thin film coil layer 12, the photoresist layer 8 is also etched by the etching process for selectively removing the seed layer 9. Then, an edge which defines the throat height zero position is also etched away from the air bearing surface. In this manner, it is impossible to attain a thin film magnetic head having a desired throat height which follows accurately a designed value, and this is one of causes for decreasing a manufacturing yield.

In order to improve the NLTS property of the thin film magnetic head, it is considered to increase the number of coil windings of the thin film coil. However, in order to increase the number of coil windings, it would be necessary to increase the number of layers of the thin film coil such as four or five layers. Then, an apex angle might be too large and it is impossible to achieve the narrow track. In order to restrict an apex angle to a certain value, the number of the coil layers has to be restricted to three, preferable two. Then, the number of coil windings could not be increased in the known thin film magnetic head.

SUMMARY OF THE INVENTION

The present invention has for its object to provide a novel and useful inductive type thin film magnetic head, in which the above mentioned problems could be solved by reducing a spacing between successive coil windings to decrease a coil width $L_C$, and as a result thereof a magnetic path length $L_M$ could be decreased to improve characteristics of the thin film magnetic head.

It is another object of the invention to provide a method of manufacturing the thin film magnetic head having the above mentioned improved characteristics in an easy and accurate manner.

According to the invention, a thin film magnetic head comprises:
- a first magnetic layer having a pole portion;
- a second magnetic layer having a pole portion which constitutes an air bearing surface together with said pole portion of the first magnetic layer and being magnetically coupled with said first magnetic layer;
- a gap layer made of a non-magnetic material and being interposed between said pole portion of the first magnetic layer and said pole portion of the second magnetic layer;
- a thin film coil consisting of one or more thin film coil layers and having a portion which is arranged between said first and second magnetic layers and is supported by an insulating material in an electrically isolated manner; and
- a substrate supporting said first and second magnetic layers, gap layer and thin film coil;

wherein said one thin film coil layer or at least one of said more than one thin film coil layers comprises a first insulating layer, coil windings formed by an electrically conductive material deposited in coil-shaped recesses formed in a surface of said first insulating layer, and a second insulating layer covering said first insulating layer and coil windings.

In the thin film magnetic head according to the invention, said first insulating layer may be made of an inorganic insulating material, particularly silicon oxide, silicon nitride and alumina. These inorganic insulating materials are mechanically strong and thus can be subjected to a fine machining. Therefore, a distance between adjacent recesses, i.e. a spacing between successive coil windings of the thin film coil can be smaller than 1 μm, particularly can be set to a value within a range of 0.3–0.5 μm. If a spacing between successive coil windings is set to be smaller than 0.3 μm, walls defining the recess might be broken and successive coil windings might not be isolated sufficiently. Moreover, if a spacing between successive coil windings is larger than 0.5 μm, a magnetic path length could be sufficiently decreased. According to the invention, by reducing a spacing between successive coil windings to 0.3–0.5 μm, a magnetic path length can be shortened to 50–70% of the known thin film magnetic head, and therefore characteristics of the thin film magnetic head can be improved to a large extent.

It should be noted that said electrically conductive material constituting the thin film coil may be a copper deposited by a chemical vapor deposition. In this case, it is preferable to provide a Ti, TiN or TaN film on inner walls of the recesses and to deposit a copper by a chemical vapor deposition into a space defined by such a film.

According to the invention, a method of manufacturing a thin film magnetic head comprising
- a first magnetic layer having a pole portion;
- a second magnetic layer having a pole portion which constitutes an air bearing surface together with said pole portion of the first magnetic layer and being magnetically coupled with said first magnetic layer;
- a gap layer made of a non-magnetic material and being interposed between said pole portion of the first magnetic layer and said pole portion of the second magnetic layer;
- a thin film coil consisting of one or more thin film coil layers and having a portion which is arranged between said first and is supported by an insulating material in an electrically isolated manner; and
- a substrate supporting said first and second magnetic layers, gap layer and thin film coil;

wherein a step of forming at least one thin film coil layer comprises the steps of:
- a step of forming a first insulating layer to be supported by said substrate;
- a step of forming coil-shaped recesses in said first insulating layer such that said recesses have a width and a spacing which are equal to a width and a spacing of coil windings of the thin film coil to be formed and have a depth which is deeper than a height of the coil windings;
- a step of depositing an electrically conductive material within said recesses; and
- a step of forming a second insulating layer on said first insulating layer.

Upon practicing the method of manufacturing the thin film magnetic head according to the invention, it is preferable to deposit the electrically conductive material within said recesses by a chemical vapor deposition, but the electrically conductive material may be deposited by sputtering an electrically conductive material and reflowing the deposited material or nonelectrolytic plating or electroplating.

Moreover, it is further preferable to deposit an electrically conductive material such that the first insulating layer is covered with the conductive material, and then the conductive material layer is polished until the surface of the first insulating layer is exposed.

BRIEF DESCRIPTION OF THE DRAWINGS

FIGS. 1–8 are cross sectional views showing successive steps of manufacturing a known thin film magnetic head;

FIGS. 9A and 9B to 21A and 21B are cross sectional views representing successive steps of an embodiment of the thin film magnetic head manufacturing method according to the invention;

FIG. 22 is a schematic plan view illustrating a magnetic path length of the thin film magnetic head according to the invention in comparison with that of the known thin film magnetic head;

FIGS. 23A and 23B–27A and 27B are cross sectional views and front views showing successive steps of another embodiment of the thin film magnetic head manufacturing method according to the invention; and FIGS. 28 and 29 are cross sectional views illustrating successive steps of still another embodiment of the thin film magnetic head manufacturing method according to the invention.

DESCRIPTION OF THE PREFERRED EMBODIMENT

FIGS. 9–21 show successive steps of an embodiment of the method of manufacturing the thin film magnetic head according to the invention. In these figures, A represents a cross sectional view and B illustrates a font view. It should be noted that in an actual process for manufacturing the thin film magnetic head, since a number of thin film magnetic heads are formed in a wafer, an end face of the magnetic head is not exposed, but for the sake of explanation, an end face is shown in a front view.

In the present embodiment, a composite type thin film magnetic head having a magnetoresistive type thin film magnetic head and an inductive type thin film magnetic head stacked one on the other in this order is to be manufactured.

Figure 1:
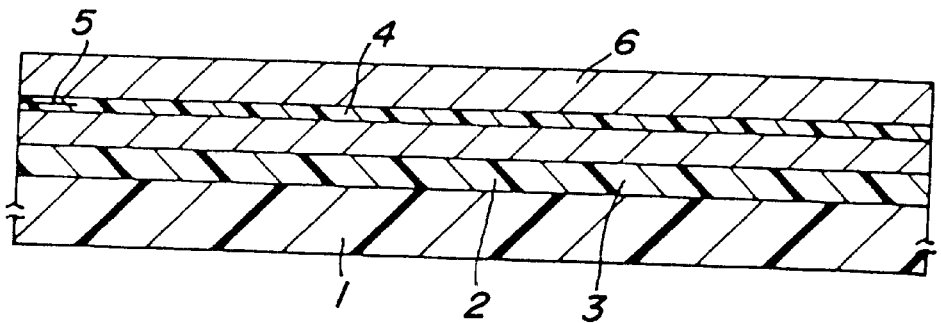
Figure 2:
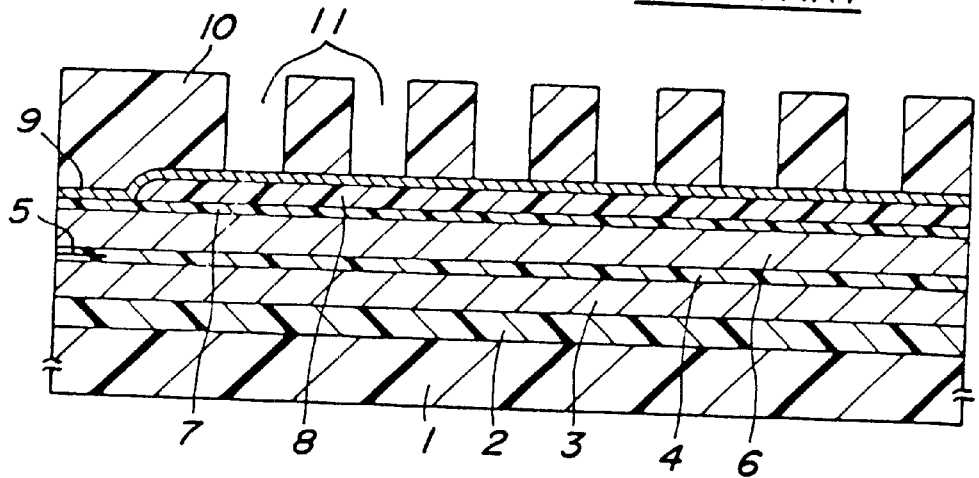
Figure 3:
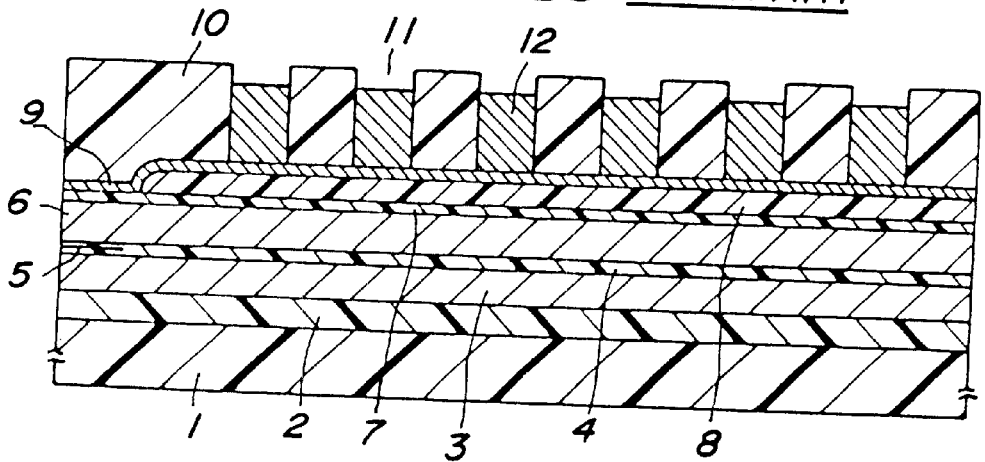
Figure 7:
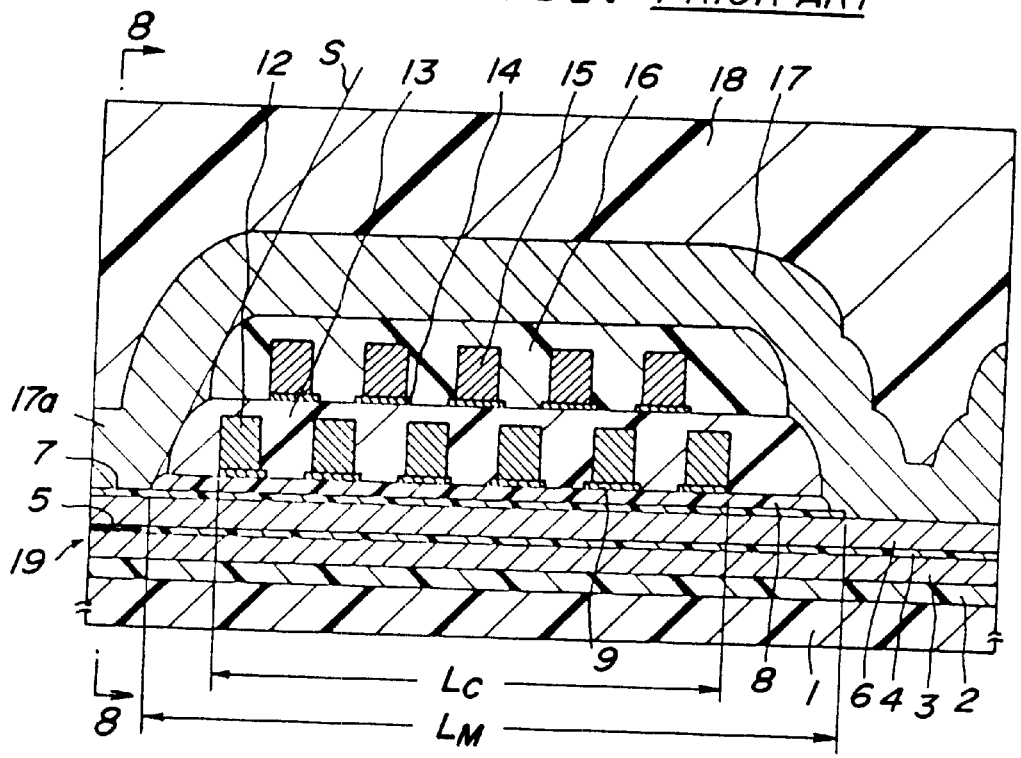
Figure 8:
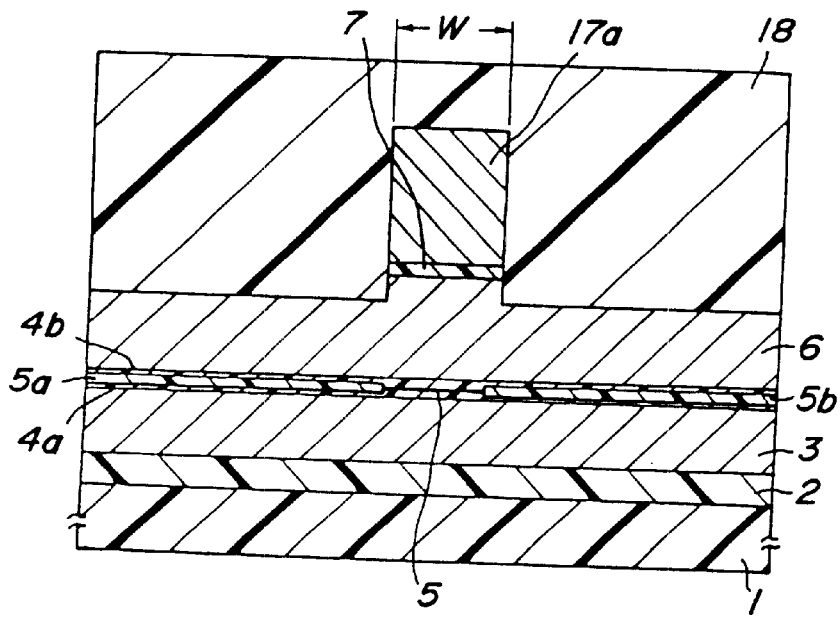
Figures 9A, 9B:
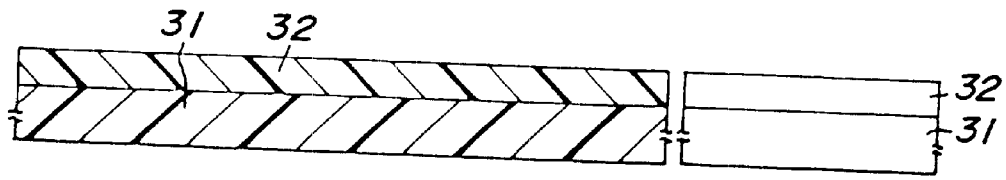
Figures 10A, 10B:
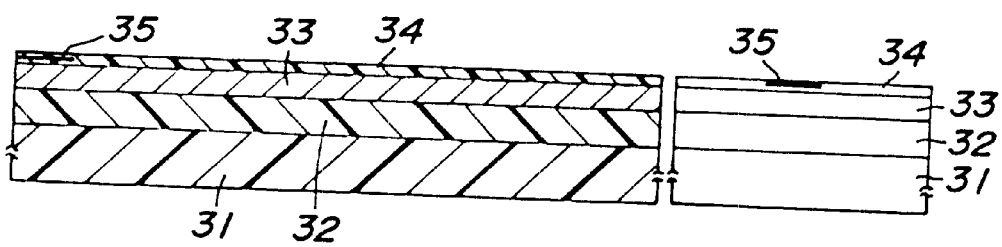

At first, as shown in FIG. 9, on a substrate 31 made of an non-magnetic and electrically insulating AlTiC and having a thickness of several millimeters, is deposited an insulating layer 32 made of an alumina having a thickness of about 5 $\mu$m. Next, as illustrated in FIG. 10, a lower shield layer 33 serving a magnetic shield for protecting an MR reproducing head from an external magnetic field is deposited to have a thickness of 2–3 $\mu$m, a lower shield gap layer made of an alumina is formed to have a thickness of 0.1 $\mu$m and a GMR layer 35 constituting a GMR reproducing element is formed to have a desired pattern by means of a high precision mask alignment, and then an upper shield gap layer having a thickness of 0.1 $\mu$m is formed. In the drawing, the lower and upper shield gap layers are denoted as a shield gap layer 34.

Figures 11A, 11B:
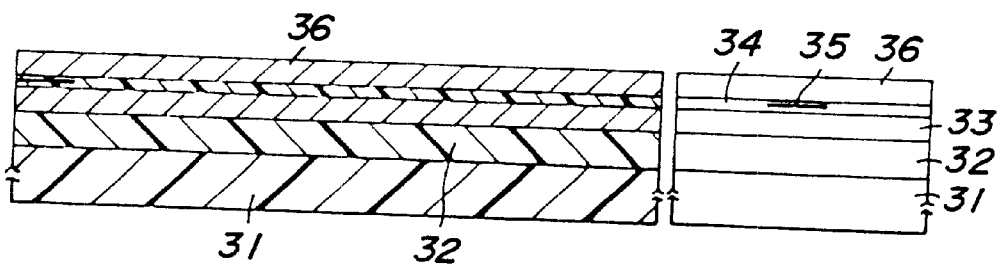

Next, after forming an electrically conductive layer not shown for forming an electrical connection to the GMR layer 5, a first magnetic layer 36 made of a permalloy is formed to have a thickness of 2–3 $\mu$m as illustrated in FIG. 11.

Figures 12A, 12B:
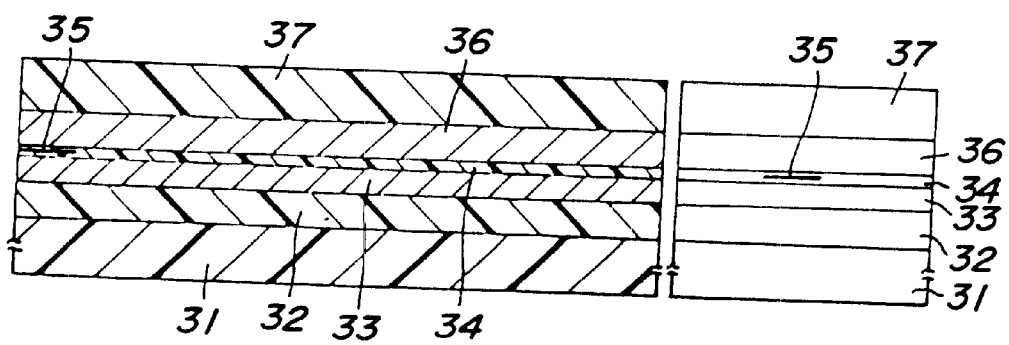

Then, as depicted in FIG. 12, on the first magnetic layer 36 is formed a silicon oxide layer 37 having a thickness of 3–4 $\mu$m by sputtering, said silicon oxide film constituting a first insulating layer in a later process. After that, openings having a desired pattern are formed in a photo-resist formed on the silicon oxide layer 37, and the silicon oxide layer is subjected to a dry etching process while the photo-resist is used as a mask to form coil-shaped recesses 38 having a depth of 2.5–3 $\mu$m, a width of 1.5–2.5 $\mu$m, and a spacing of 0.3–0.5 $\mu$m. This dry etching process may be a reactive ion etching using an etching gas such as $BCl_3$, $Cl_2$, $CF_4$ and $SF_4$. A technique of forming a fine recess in a silicon oxide layer by a dry etching has been well established in the semiconductor manufacturing technique.

Next, a copper layer 39 having a thickness of 3–4 $\mu$m is deposited at a temperature of about 150–200° C. by an organic metal-chemical vapor deposition (MO-CVD) using a copper hexafluoacetyl-acetonato (hfac) and a trimethylvinylsilane (tmvs). By using the MO-CVD, the copper layer 39 can be uniformly formed within the coil-shaped recesses 38 as well as on the silicon oxide layer.

Next, as shown in FIG. 15, the copper layer 39 is polished by a chemical-mechanical polishing (CMP) until the surface of the silicon oxide layer 37 is exposed to form coil windings 40 of a first thin film coil layer. A cross sectional dimension of the coil windings 40 of this first thin film coil layer is identical with a cross sectional dimension of the recesses 38. The coil windings 40 have a height of 3–4 $\mu$m and a width of 1.5–2–5 $\mu$m, and the thin film coil has a sufficiently low resistance. A spacing between successive coil windings 40 is identical with a spacing between successive recesses 38 and is equal to 0.3–0.5 $\mu$m, which is about 50–70% of that of the known thin film coil. In this manner, according to the invention, a magnetic path length can be shortened accordingly.

Next, as illustrated in FIG. 16, the first insulating layer 37 is subjected to a dry etching to remove selectively a portion thereof corresponding to the pole portion as well as to form a tapered edge. Then, as shown in FIG. 17, a write gap layer 41 made of an alumina and having a thickness of 100–300 nm is formed on an exposed surface of the first magnetic layer 36 and the flat surfaces of the first insulating layer 37 and coil windings of the thin film coil, said surfaces having been flattened by the above mentioned CMP. This write gap layer 41 constitutes the second insulating layer.

Next, as depicted in FIG. 18, on the write gap layer 41 is formed a second magnetic layer 42 made of a permalloy and having a thickness of 3–4 $\mu$m in accordance with a given pattern, said second magnetic layer constituting a pole chip. In a portion of the second magnetic layer 42 corresponding to the thin film coil formed by the coil windings 40, there is formed an opening. After that, an etching process is conducted while a pole portion 42a of the second magnetic layer 42 is used as a mask to remove portions of the write gap layer 41 and first magnetic layer 36 near the pole portion. In this manner, the trim structure is formed.

Next, a silicon oxide layer 43 having a thickness of 3–4 $\mu$m is formed on a whole surface and then a surface of the silicon oxide layer is flattened by CMP and a photo-resist layer is formed on the thus flattened surface. Then, a reactive ion etching is performed for the silicon oxide layer 43 formed in the opening of the second magnetic layer 42 to form coil-shaped recesses 44, and the photo-resist layer is removed. This condition is shown in FIG. 19. In the present embodiment, the coil-shaped recesses 44 formed in the silicon oxide layer 43 has the same cross sectional dimension as that of the above mentioned coil-shaped recesses 38 formed in the silicon oxide layer 37. That is to say, the coil-shaped recesses 44 has a depth of 3–4 $\mu$m, a width of 1.5–2.5 $\mu$m and a spacing of 0.3–0.5 $\mu$m. According to the invention, the coil-shaped recesses may have different cross sectional dimensions.

Next, a copper layer having a thickness of 3–4 $\mu$m is formed by the MO-CVD, and then this copper layer is polished by CMP until its surface is exposed to form coil windings 45 of a second thin film coil layer as illustrated in FIG. 20.

Then, after forming an insulating layer 46 made of a photo-resist and having a thickness of 3–5 $\mu$m on the coil windings 45, a third magnetic layer 47 made of a permalloy and having a thickness of 3–4 $\mu$m is formed on the insulating layer, and an overcoat layer 47 made of an alumina is formed on the third magnetic layer as shown in FIG. 21, said third magnetic layer serving as a top pole. The third magnetic layer 47 is brought into contact with the second magnetic layer 42 such that a closed magnetic path is formed by the first magnetic layer 36, second magnetic layer 42 and third magnetic layer 47.

FIG. 22 is a schematic plan view showing a magnetic path length $L_{MI}$ of the thin film magnetic head according to the invention and a magnetic path length $L_{MP}$ of the known thin film magnetic head in comparison with each other. According to the invention, a width of the coil windings 40 and 45 of the tin film coil is identical with that of the known thin film coil as stated above, but a spacing can be shortened to 0.3–0.5 μm while a spacing of the known thin film coil is about 2 μm. Therefore, a magnetic path length LMI can be reduced to about 60% of the known magnetic path length $L_{MP}$, and therefore it is possible to improve the flux rise time, NLTS and over-write characteristics.

FIGS. 23A, 23B–27A, 27B are cross sectional views and front views showing successive steps of a second embodiment of the method of manufacturing the thin film magnetic head according to the invention. In the present embodiment, steps up to a step of forming the write gap layer after forming the coil windings 40 of the first layer of the thin film coil are identical with those of the first embodiment.

In this embodiment, as illustrated in FIG. 23, after forming a photo-resist layer 51 on a portion of the write gap layer 41 situating on the coil windings 40 of the thin film coil, a seed layer 52 made of a copper and having a thickness of 100 nm is formed on a whole surface. The photo-resist layer 51 serves to improve the electrical isolation between the first layer and the second layer of the thin film coil.

Next, openings are formed in the photo-resist layer by a photo-lithography used in the known thin film manufacturing process, and coil windings 53 of a second thin film coil layer is formed within the openings by an electroplating. Then, the photo-resist layer is removed as shown in FIG. 24. As stated above, the coil windings 53 formed in this manner have a height of 2–3 μm, a width of 2 μm and a spacing of 2 μm.

Then, as depicted in FIG. 25, after covering the thin film coil windings 53 with a photo-resist layer 54, a second magnetic layer 55 is formed to have a desired pattern. An etching is carried out by using a pole portion 55a of the second magnetic layer 55 as a mask to remove a portion of the write gap layer 41 near the pole portion and a thickness of the first magnetic layer 36 is partially reduced to constitute the trim structure as illustrated in FIG. 26. Next, an overcoat layer 56 made of an alumina is formed as shown in FIG. 27.

In the present embodiment, the coil windings 40 of the first thin film layer is formed by the Cu-CVD, and thus a spacing between adjacent coil windings can be shortened to 0.3–0.5 μm, but since the coil windings 53 of the second thin film coil layer is formed by the electroplating like as the known method, a space of these coil windings is wide such as 2–3 μm. However, the number of the coil windings 40 of the first thin film coil layer can be increased, and therefore although the number of the coil windings 53 of the second thin film coil layer is small, the magnetic path length of the thin film magnetic head can be reduced.

The present invention is not limited to the above mentioned embodiments, but many alternations and modifications may be considered within the scope of the invention. For instance, in the above embodiments, there are provided two layers in the thin film coil, but one thin film coil layer or more than two thin film coil layers may be provided. According to the present invention, since the number of coil windings can be increased, it is almost unnecessary to provide more than three thin film coil layers.

Further, in the above embodiments, the thin film coil is formed by the Cu-CVD, but according to the invention other metal may be formed by CVD. In case of using the Cu-CVD, it is preferable to form a Ti, TiN or TaN film on the recesses prior to the formation of the copper layer.

Furthermore, in the above explained embodiments, the first insulating layer in which the recesses are formed is made of a silicon oxide, but according to the invention, the first insulating layer may be made of a silicon nitride or alumina.

In the above embodiments, the thin film coil is formed by the MO-CVD, but according to the invention, the thin film coil may be formed within the recesses by depositing an electrically conductive material by sputtering and then by performing the reflow process under a high vacuum condition.

Moreover, an electrically conductive material may be deposited within the recesses by the electroplating or electroless plating. In case of using the electroplating, after forming the coil-shaped recesses 38 in the silicon oxide layer 37 constituting the first insulating layer as shown in FIG. 28, a Ti layer 61 is formed to have a thickness of 100–300 nm and the copper layer 39 is formed by the electroplating while the Ti layer is used as a seed layer, and then the copper layer is polished by CMP until the surface of the silicon oxide layer 37 is exposed to form the coil windings 40 of the thin film coil as illustrated in FIG. 29. During this CMP process, a portion of the Ti layer 61 serving as the seed layer deposited on the silicon oxide layer is removed, and therefore adjacent coil windings 40 can be isolated effectively. In this manner, it is possible to obtain the coil windings 40 formed by the Ti layer 61 applied on the inner walls of the coil-shaped recesses 38 and the copper deposited within spaces defined by the Ti layer.

Furthermore, in the above explained embodiments, the magnetoresistive type thin film reading magnetic head is formed on the substrate and then the inductive type thin film writing magnetic head is provided on the magnetoresistive type magnetic head to constitute a normal type composite thin film magnetic head. But according to the invention, it is also possible to realize a reverse type composite thin film magnetic head by reversing the up side down relationship between the magnetoresistive type thin film magnetic head and inductive type thin film magnetic head. Further, it is not always necessary to constitute the composite type magnetic head, but only the inductive type thin film magnetic head may be provided on the substrate.

In the thin film magnetic head according to the invention, since a spacing between adjacent coil windings of the thin film coil can be smaller than that of the known thin film magnetic head, a magnetic path length can be shortened to improve characteristics such as flux rise time, NLTS and over write properties. Moreover, when the first insulating layer is made of an inorganic insulating material such as silicon oxide, silicon nitride and alumina which can be subjected to the fine processing, a spacing between successive coil-shaped recesses can be extremely shortened such as 0.3–0.5 μm. Since a spacing between adjacent coil windings can be shortened, the number of coil windings per one thin film coil layer can be increased and the NLTS property can be improved.

Moreover, according to the invention, the retardation of the edge position of the photo-resist pattern during the etching for the seed layer can be avoided, and thus the throat height zero position could never be shifted during the manufacturing process. Therefore, it is possible to obtain the thin film magnetic head having the throat height which is accurately identical with a designed value, and a manufacturing yield can be improved.

What is claimed is:

1. A thin film magnetic head comprising:

a first magnetic layer having a pole portion;

a second magnetic layer having a pole portion which constitutes an air bearing surface together with said pole portion of the first magnetic layer and being magnetically coupled with said first magnetic layer;

a gap layer made of a non-magnetic material and being interposed between said pole portion of the first magnetic layer and said pole portion of the second magnetic layer;

a thin film coil consisting of one or more thin film coil layers and having a portion which is arranged between said first and second magnetic layers and is supported by an insulating material in an electrically isolated manner; and a substrate supporting said first and second magnetic layers, gap layer and thin film coil;

wherein said one thin film coil layer or at least one of said more than one thin film coil layers comprises a first insulating layer, coil windings formed by a conductive material deposited in coil-shaped recesses formed in a surface of said first insulating layer having a thickness larger than a height of the coil windings, and a second insulating layer covering said first insulating layer and coil windings.

2. A thin film magnetic head according to claim 1, wherein said first insulating layer is made of an inorganic insulating material.

3. A thin film magnetic head according to claim 2, wherein said inorganic insulating material is selected from the group consisting of silicon oxide, silicon nitride and alumina.

4. A thin film magnetic head according to claim 1, wherein said electrically conductive material deposited within said recesses formed in said first insulating layer and constituting the coil windings is a copper.

5. A thin film magnetic head according to claim 1, wherein said conductive material constituting the coil windings of the thin film coil is consisting of a Ti, TiN or TaN film provided on inner walls of said recesses formed in the first insulating layer and a copper deposited on portions surrounded by said film.

6. A thin film magnetic head according to claim 1, wherein said electrically conductive material deposited within said recesses formed in said first insulating layer and constituting the coil windings is deposited by chemical vapor deposition.

7. A thin film magnetic head according to claim 1, wherein said electrically conductive material deposited within said recesses formed in said first insulating layer and constituting the coil windings is deposited by sputtering and reflow.

8. A thin film magnetic head according to claim 1, wherein said electrically conductive material deposited within said recesses formed in said first insulating layer and constituting the coil windings is deposited by a plating.

9. A thin film magnetic head according to claim 1, wherein said electrically conductive material deposited within said recesses formed in said first insulating layer and constituting the coil windings is deposited by an electroplating.

10. A thin film magnetic head according to claim 1, wherein a spacing between successive coil windings of the thin film coil is smaller than 1 $\mu$m.

11. A thin film magnetic head according to claim 10, wherein said spacing is 0.3–0.5 $\mu$m.

12. A thin film magnetic head according to any one of claims 1–11, wherein said thin film magnetic head is formed as a composite type thin film magnetic head, in which a magnetoresistive type thin film reading magnetic head is arranged in an electrically insulated and magnetically shielded manner between said substrate and said first insulating layer such that a side edge of the magnetoresistive thin film reading magnetic head is exposed on the air bearing surface.

* * * * *